(12) United States Patent
Chuong et al.

(10) Patent No.: US 9,347,330 B2
(45) Date of Patent: May 24, 2016

(54) FINGER SEAL

(71) Applicant: United Technologies Corporation, Hartford, CT (US)

(72) Inventors: Conway Chuong, Manchester, CT (US); Matthew Budnick, Tolland, CT (US)

(73) Assignee: United Technologies Corporation, Hartford, CT (US)

(*) Notice: Subject to any disclaimer, the term of this patent is extended or adjusted under 35 U.S.C. 154(b) by 110 days.

(21) Appl. No.: 13/730,900

(22) Filed: Dec. 29, 2012

(65) Prior Publication Data

US 2014/0183825 A1 Jul. 3, 2014

(51) Int. Cl.
*F16J 15/32* (2006.01)
*F01D 11/00* (2006.01)
*F16J 15/08* (2006.01)

(52) U.S. Cl.
CPC ............ *F01D 11/003* (2013.01); *F01D 11/005* (2013.01); *F16J 15/0887* (2013.01); *F05D 2240/59* (2013.01); *F05D 2250/293* (2013.01); *F05D 2300/5024* (2013.01)

(58) Field of Classification Search
CPC .. F01D 11/003; F01D 11/005; F16J 15/0887; F05D 2250/293; F05D 2300/5024
USPC ................................................. 277/650, 652
See application file for complete search history.

(56) References Cited

U.S. PATENT DOCUMENTS

| | | | |
|---|---|---|---|
| 2,124,108 A | 7/1938 | Grece | |
| 3,576,328 A | 4/1971 | Vose | |
| 3,970,319 A | 7/1976 | Carroll et al. | |
| 4,022,948 A * | 5/1977 | Smith et al. | ................ 428/542.8 |
| 4,088,422 A | 5/1978 | Martin | |
| 4,114,248 A | 9/1978 | Smith et al. | |
| 4,478,551 A | 10/1984 | Honeycutt, Jr. et al. | |
| 4,566,280 A | 1/1986 | Burr | |
| 4,645,217 A | 2/1987 | Honeycutt, Jr. et al. | |
| 4,678,113 A | 7/1987 | Bridges et al. | |
| 4,738,453 A | 4/1988 | Ide | |
| 4,756,536 A | 7/1988 | Belcher | |
| 4,920,742 A | 5/1990 | Nash et al. | |
| 4,987,736 A | 1/1991 | Ciokajlo et al. | |
| 4,993,918 A | 2/1991 | Myers et al. | |
| 5,031,922 A | 7/1991 | Heydrich | |
| 5,042,823 A | 8/1991 | Mackay et al. | |

(Continued)

FOREIGN PATENT DOCUMENTS

| | | |
|---|---|---|
| EP | 0745795 A1 | 12/1996 |
| EP | 1705343 A2 | 9/2006 |

OTHER PUBLICATIONS

International Searching Authority, PCT Notification of Transmittal of the International Search Report and the Written Opinion, Apr. 8, 2014, 10 pages.

(Continued)

*Primary Examiner* — Gilbert Lee
(74) *Attorney, Agent, or Firm* — Kinney & Lange, P.A.

(57) ABSTRACT

An assembly for a gas turbine engine includes a component and a finger seal. The component has a first surface and a second surface. The first surface has an elevation that differs from an elevation of the second surface. The finger seal is connected to the first surface and extends above the second surface. The disposition of the second surface relative to the finger seal creates a cavity below a curved portion of the finger seal.

20 Claims, 4 Drawing Sheets

(56) References Cited

U.S. PATENT DOCUMENTS

| | | |
|---|---|---|
| 5,071,138 A | 12/1991 | Mackay et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |
| 5,188,507 A | 2/1993 | Sweeney |
| 5,211,541 A | 5/1993 | Fledderjohn et al. |
| 5,236,302 A | 8/1993 | Weisgerber et al. |
| 5,246,295 A | 9/1993 | Ide |
| 5,273,397 A | 12/1993 | Czachor et al. |
| 5,338,154 A | 8/1994 | Meade et al. |
| 5,370,402 A | 12/1994 | Gardner et al. |
| 5,385,409 A | 1/1995 | Ide |
| 5,401,036 A | 3/1995 | Basu |
| 5,474,305 A | 12/1995 | Flower |
| 5,524,846 A * | 6/1996 | Shine et al. ............. 244/53 R |
| 5,558,341 A | 9/1996 | McNickle et al. |
| 5,560,198 A | 10/1996 | Brewer et al. |
| 5,632,493 A | 5/1997 | Gardner |
| 5,755,445 A | 5/1998 | Arora |
| 5,911,400 A | 6/1999 | Niethammer et al. |
| 5,961,279 A | 10/1999 | Ingistov |
| 6,196,550 B1 | 3/2001 | Arora et al. |
| 6,343,912 B1 | 2/2002 | Manteiga et al. |
| 6,364,316 B1 | 4/2002 | Arora |
| 6,439,841 B1 | 8/2002 | Bosel |
| 6,601,853 B2 | 8/2003 | Inoue |
| 6,619,030 B1 | 9/2003 | Seda et al. |
| 6,637,751 B2 | 10/2003 | Aksit et al. |
| 6,638,013 B2 | 10/2003 | Nguyen et al. |
| 6,652,229 B2 | 11/2003 | Lu |
| 6,736,401 B2 | 5/2004 | Chung et al. |
| 6,805,356 B2 | 10/2004 | Inoue |
| 6,811,154 B2 | 11/2004 | Proctor et al. |
| 6,935,631 B2 | 8/2005 | Inoue |
| 6,983,608 B2 | 1/2006 | Allen, Jr. et al. |
| 7,094,026 B2 | 8/2006 | Coign et al. |
| 7,238,008 B2 | 7/2007 | Bobo et al. |
| 7,367,567 B2 | 5/2008 | Farah et al. |
| 7,371,044 B2 | 5/2008 | Nereim |
| 7,631,879 B2 | 12/2009 | Diantonio |
| 7,735,833 B2 | 6/2010 | Braun et al. |
| 7,798,768 B2 | 9/2010 | Strain et al. |
| 8,069,648 B2 | 12/2011 | Snyder et al. |
| 8,083,465 B2 | 12/2011 | Herbst et al. |
| 8,152,451 B2 | 4/2012 | Manteiga et al. |
| 8,221,071 B2 | 7/2012 | Wojno et al. |
| 8,245,518 B2 | 8/2012 | Durocher et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2005/0046113 A1 | 3/2005 | Inoue |
| 2006/0197287 A1 | 9/2006 | Farah et al. |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0307165 A1 | 12/2010 | Wong et al. |
| 2011/0000223 A1 | 1/2011 | Russberg |
| 2011/0214433 A1 | 9/2011 | Feindel et al. |
| 2011/0262277 A1 | 10/2011 | Sjoqvist et al. |
| 2012/0111023 A1 | 5/2012 | Sjoqvist et al. |

OTHER PUBLICATIONS

European Patent Office, extended European search report, Jan. 8, 2016, 7 pages.

* cited by examiner

FINGER SEAL

BACKGROUND

The invention relates to gas turbine engines, and more particularly to finger seals used in gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Components such as finger seals are used in gas turbine engines and act as flow discouragers and seals to seal off cavities from one another. Typically, finger seals are directly attached to components. As a result of this arrangement, heat transfers directly to the finger seal via conduction. In most instances, heat transfer via conduction is undesirable as more costly materials that perform better at higher temperatures must be used to form the finger seal.

SUMMARY

An assembly for a gas turbine engine includes a component and a finger seal. The component has a first surface and a second surface. The first surface has an elevation that differs from an elevation of the second surface. The finger seal is connected to the first surface and extends above the second surface. The disposition of the second surface relative to the finger seal creates a cavity below a curved portion of the finger seal.

An assembly for a gas turbine engine includes a component and a finger seal. The component has a raised mounting surface and a main surface. The main surface has an elevation that is staggered relative to an elevation of the raised mounting surface. The finger seal has a free end, a first curved section, and a fixed end. The fixed end is connected to the raised mounting surface and the first curved section is disposed adjacent to the fixed end and is positioned over a portion of the main surface that is adjacent the raised mounting surface.

An assembly for a gas turbine engine includes a component and a finger seal. The component has a first surface and a second surface. The first surface has an elevation that differs from an elevation of the second surface. The finger seal is connected to the first surface and extends above the second surface. A cooling air flow is passed along the second surface and along a curved portion of the finger seal.

DETAILED DESCRIPTION

The application discloses a staggered surface configuration on the component such that a cavity is formed adjacent a high-stress portion(s) of the finger seal. The cavity reduces conductive heat transfer to the finger seal at the high-stress portion. This configuration increases margin of safety and allows for less expensive materials to be used for the finger seal, by effectively reducing the temperature of the seal.

Figure 1:
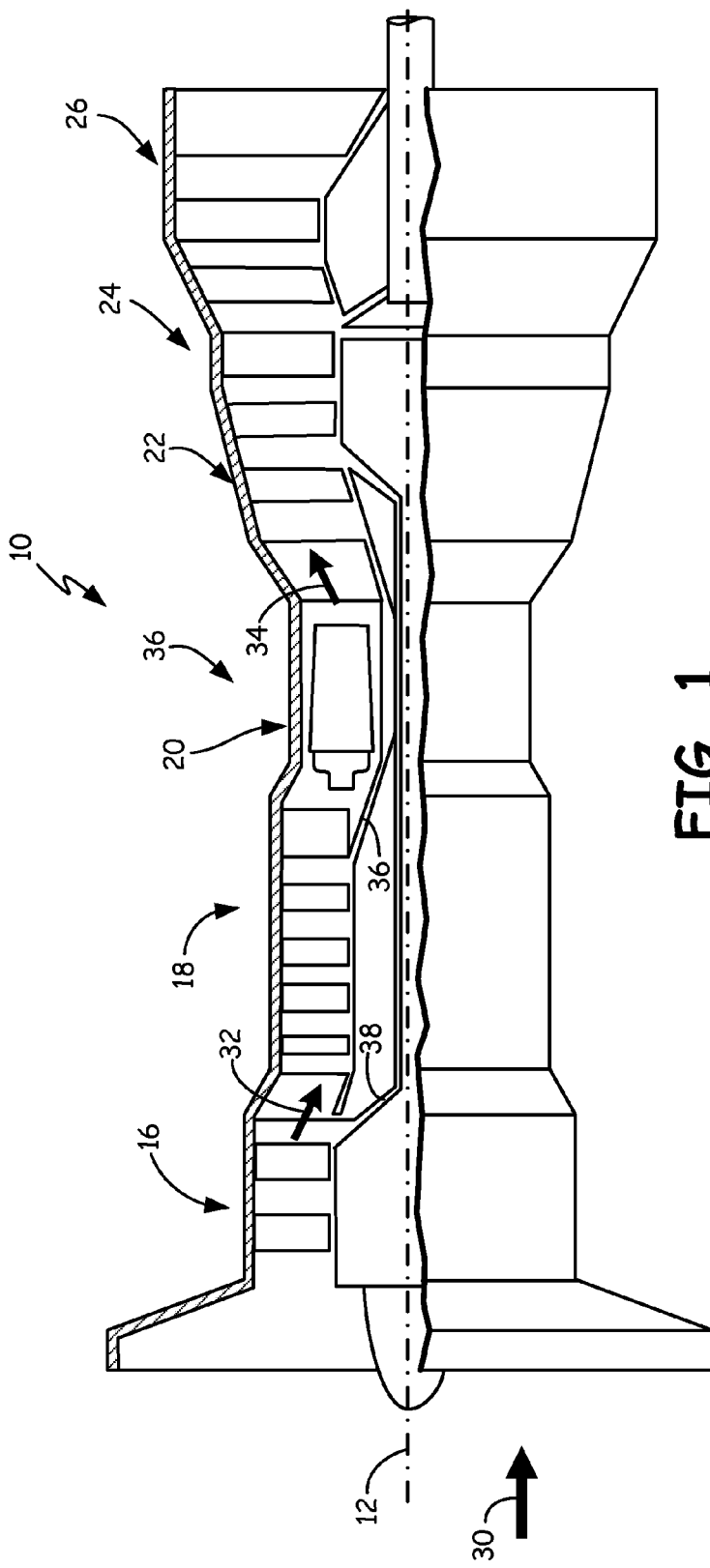
FIG. 1 is a general industrial turbine cross-section.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2A:
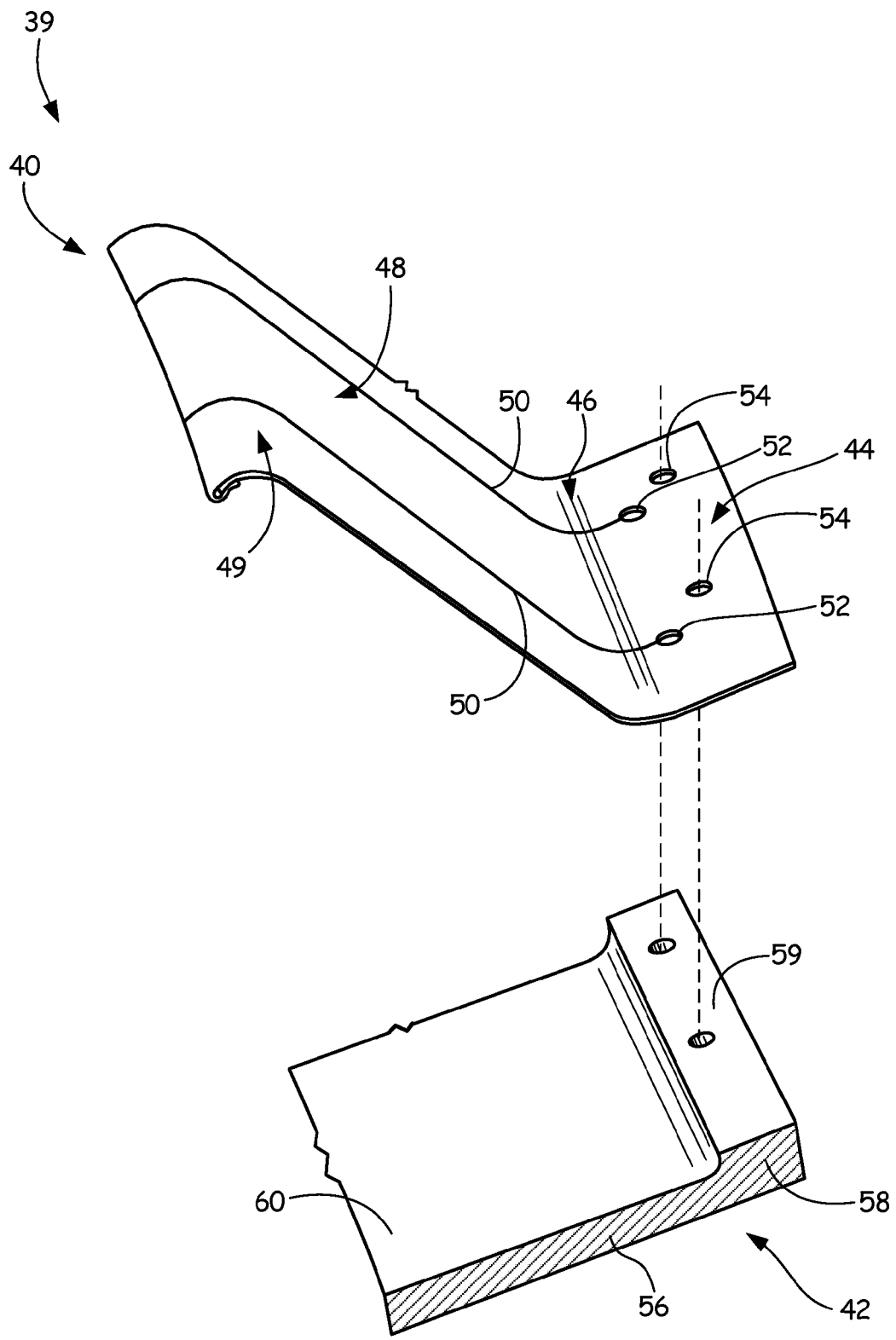
FIG. 2A is an exploded perspective view of a portion of a finger seal and a portion of a component.
Figure 2B:
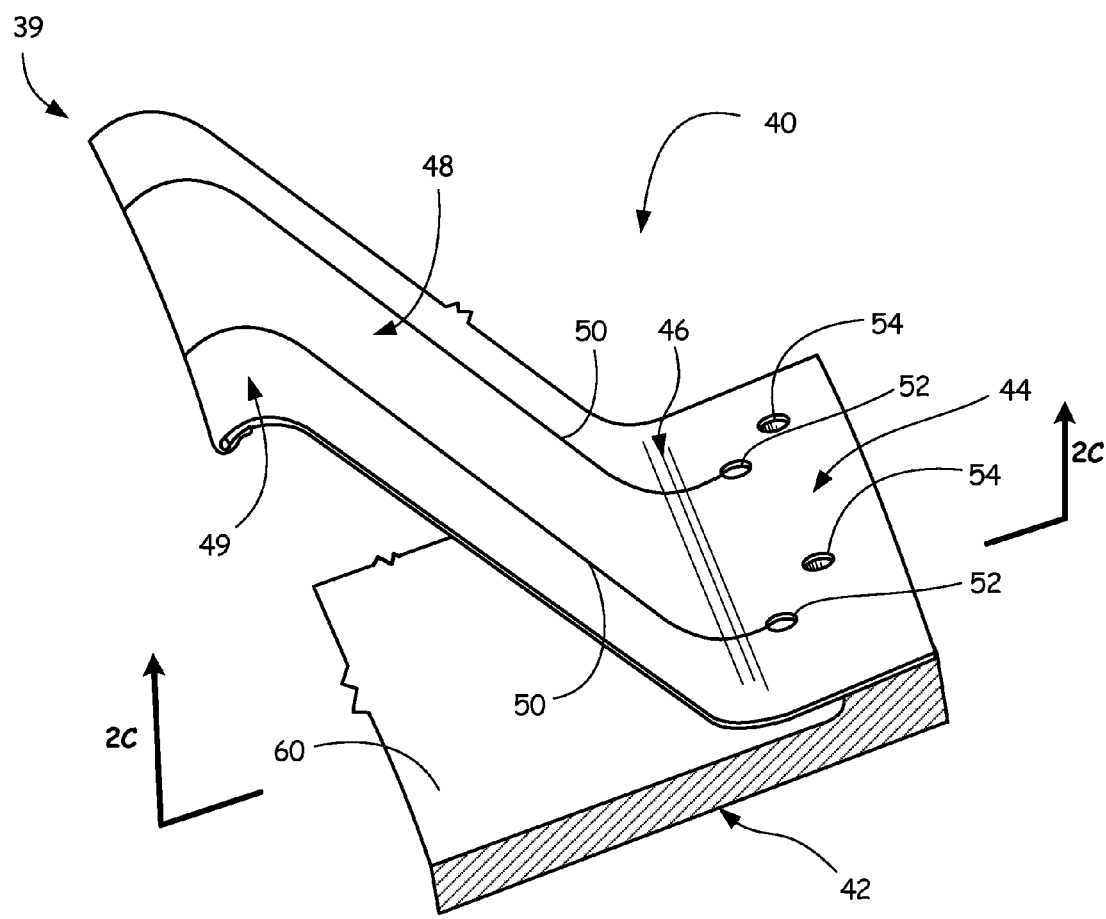
FIG. 2B is a perspective view showing the finger seal mounted to the component.
Figure 2C:
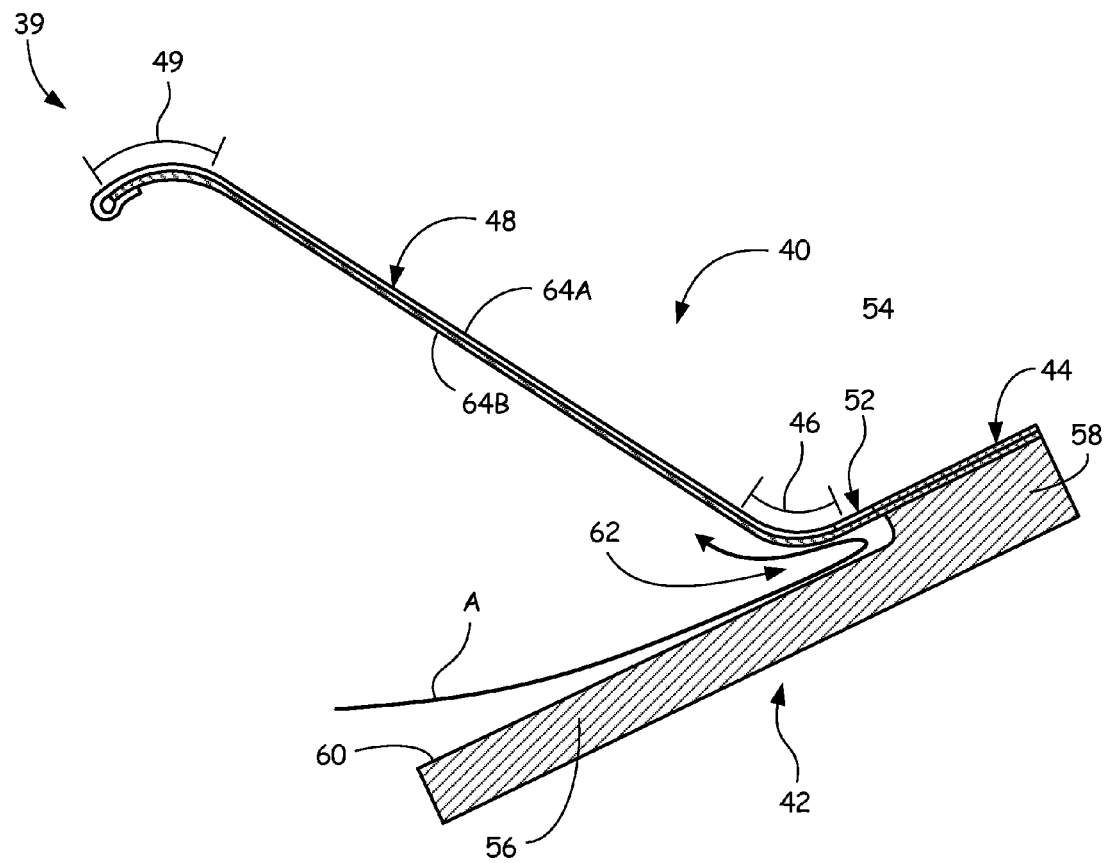
FIG. 2C is a cross-section along section 2C-2C of FIG. 2B.

FIG. 2A shows an exploded assembly 39 of finger seal 40 and component 42. FIG. 2B shows finger seal 40 mounted to component 42. FIG. 2C shows a cross-section along section 2C-2C of FIG. 2B. Finger seal 40 includes fixed end portion 44, first curved portion 46, free end portion 48, second curved portion 49, slots 50, keyholes 52, mounting holes 54, first ply 64A (FIG. 2C), and second ply 64B (FIG. 2C). Component 42 includes main body 56 and mounting portion 58. Mounting portion 58 includes surface 59 (shown in FIG. 2A). Main body 56 includes surface 60.

In FIGS. 2A and 2B, component 42 and finger seal 40 are shown broken away as only a portion of component 42 and finger seal 40 is illustrated. For example, finger seal 40 can have an annular shape and be disposed so as to extend circumferentially around centerline axis 12 (FIG. 1) of gas turbine engine 10.

Fixed end portion 44 is adapted to be disposed directly on surface 59 of component 42 and extends to first curved portion 46. First curved portion 46 comprises a curved section of finger seal 40 that is disposed between fixed end portion 44 and free end portion 48. When finger seal 40 and component 42 are assembled, fixed end portion 44 is connected to mounting portion 58 and first curved portion 46 is disposed above main body 56. First curved portion 46 additionally forms a portion of cavity 62 (FIG. 2C). Free end portion 48 extends away from first curved portion 46 and extends to second curved portion 49. Free end portion 48 cantilevers above main body 56 and is supported from fixed end portion 44. Mounting holes 54 receive fasteners (not shown) to connect seal 40 to mounting portion 58 of component 42. In other embodiments, seal 40 can be connected to component 42 by welding, brazing, adhesives, rivets, or another form of connection.

Main body 56 has a different thickness than mounting portion 58. This can result from a depression such as a cutout being formed in main body 56 or from mounting portion 58 being raised relative to portions of component 42 including main body 56. As a result of the different thicknesses of main body 56 and mounting portion 58, surface 60 of main body 56 is staggered in elevation relative to surface 59 (FIG. 2A) of mounting portion 58.

Cavity 62 is formed as a result of the disposition of main body 56 relative to mounting portion 58 and finger seal 40. Cavity 62 can be the result of different thickness of main body 56 relative to mounting portion 58 in some embodiments. In other embodiments, main body 56 and mounting portion 58 may have a same thickness but are staggered relative to one another. Finger seal 40, which extends from mounting portion 58, is arranged above main body 56. Cavity 62 is disposed between first curved portion 46 and surface 60, and extends to mounting portion 58. Cavity 62 is disposed below first curved portion 46 and keyholes 52 in a high stress area of finger seal 40. Positioning cavity 62 between first curved portion 46 and keyholes 52 and surface 60 reduces conductive heat transfer to finger seal 40 in those areas. In one embodiment, cooling air flow A (FIG. 2C) can be passed through cavity 62 and along first curved portion 46 to cool finger seal 40 by convective heat transfer.

Keyways 52 are positioned above cavity 62 adjacent the edge of mounting portion 58. Slots 50 extend from keyways 52 along first curved portion 46, free end portion 48, and second curved portion 49. Because the section for FIG. 2C extends along one of the slots 50 (FIG. 2B), only one keyway 52 is illustrated in FIG. 2C. This keyway 52 is disposed only in first ply 64A. Additionally, because the section taken for FIG. 2C extends along one slot 50, only second ply 64B is cross-hatched in FIG. 2C for an entire length. First ply 64A is not cross-hatched along first curved portion 46, free end portion 48, and second curved portion 49.

In the embodiment shown in FIG. 2C, finger seal 40 utilizes two layers of plies 64A and 64B. Each layer of plies 64A and 64B is divided into a number of spaced finger elements by slots 50 that extend from keyways 52. Slots 50 space the finger elements in order to reduce the hoop stress in finger seal 40. Keyways 52 are circularly shaped so as not to propagate slots 50 across the entire finger seal 40. Slots 50 create a space between the finger elements; however, this gap is sealed by the adjoining ply which is positioned such that the finger elements of each ply block any slots 50 of the adjacent ply to reduce gas leakage past finger seal 40. Thus, second ply 64B includes slots and keyways that are not illustrated in the FIGURES because slots and keyways of second ply 64B are staggered in a circumferential direction relative to slots 50 and keyways 52 of first ply 64A, and therefore, are covered by first ply 64A in FIGS. 2A and 2B.

Finger seal 40 is formed of thin deflectable and formable metal such as sheet stock and has first ply 64A disposed over second ply 64B. First ply 64A and second ply 64B are connected together by overlapping first ply 64A around second ply 64B at second curved portion 49 at the end of finger seal 40. First ply 64A and second ply 64B are additionally connected together at fixed end portion 44 by compression of fasteners (not shown) that are received in mounting holes 54. Use of multiple laminate plies such as first ply 64A and second ply 64B provides for increased ability of finger seal 40 to create a seal. In other embodiments, finger seal 40 may include three or more layers or only a single layer.

The application discloses a staggered surface configuration on the component such that a cavity is formed adjacent a high-stress portion(s) of the finger seal. The cavity reduces conductive heat transfer to the finger seal at the high-stress portion. This configuration increases margin of safety and allows for less expensive materials to be used for the finger seal.

Discussion of Possible Embodiments

The following are non-exclusive descriptions of possible embodiments of the present invention.

An assembly for a gas turbine engine includes a component and a finger seal. The component has a first surface and a second surface. The first surface has an elevation that differs from an elevation of the second surface. The finger seal is connected to the first surface and extends above the second surface. The disposition of the second surface relative to the finger seal creates a cavity below a curved portion of the finger seal.

The assembly of the preceding paragraph can optionally include, additionally and/or alternatively, any one or more of the following features, configurations and/or additional components:

the finger seal has a plurality of slots connected to keyholes, and the keyholes are positioned above the cavity;

the finger seal is fixed to the first surface and cantilevers to a free end that is disposed above the second surface;

a cooling air flow is passed along the second surface and into the cavity;

the cooling air flow passes along the curved portion of the finger seal;

the first surface is formed by a raised portion of the component; and the second surface is recessed relative to a remainder of the component including the first surface.

An assembly for a gas turbine engine includes a component and a finger seal. The component has a raised mounting surface and a main surface. The main surface has an elevation that is staggered relative to an elevation of the raised mounting surface. The finger seal has a free end, a first curved section, and a fixed end. The fixed end is connected to the raised mounting surface and the first curved section is disposed adjacent to the fixed end and is positioned over a portion of the main surface that is adjacent the raised mounting surface.

The assembly of the preceding paragraph can optionally include, additionally and/or alternatively, any one or more of the following features, configurations and/or additional components:

the free end and curved section of the finger seal has a plurality of slots that extend to connect to keyholes adjacent the free end, and the keyholes are positioned above the main surface;

the free end of the finger seal cantilevers to a second curved section disposed above the main surface;

a cooling air flow is passed along the main surface;

the cooling air flow passes along the curved section of the finger seal;

the staggered elevation of the main surface relative to the raised mounting surface creates an undercut below the curved section of the finger seal; and the main surface is recessed relative to a remainder of the component including the raised mounting surface.

An assembly for a gas turbine engine includes a component and a finger seal. The component has a first surface and a second surface. The first surface has an elevation that differs from an elevation of the second surface. The finger seal is connected to the first surface and extends above the second surface. A cooling air flow is passed along the second surface and along a curved portion of the finger seal.

The assembly of the preceding paragraph can optionally include, additionally and/or alternatively, any one or more of the following features, configurations and/or additional components:

the finger seal has a plurality of slots connected to keyholes, and the keyholes are positioned above a cavity that is formed between the second surface and the finger seal;

the second surface is recessed relative to a remainder of the component including the first surface;

the first surface is formed by a raised portion of the component; and the finger seal is fixed to the first surface and cantilevers to a free end that is disposed above the second surface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
a component having a main surface, a protrusion extending from the main surface, and a raised mounting surface disposed on the protrusion, wherein the main surface has an elevation that is staggered relative to an elevation of the raised mounting surface; and
a finger seal having a free end, a first curved section, and a fixed end, wherein the fixed end is connected to the raised mounting surface, the fixed end extending from the raised mounting surface such that the fixed end is offset from and generally parallel to the main surface, and wherein the first curved section is disposed adjacent the fixed end and is positioned over a portion of the main surface that is adjacent the raised mounting surface, and wherein the component has a first thickness at the main surface and a second thickness at the mounting surface, and wherein the second thickness is greater than the first thickness such that an undercut cavity is defined by the main surface and the fixed end of the finger seal, and wherein the finger seal comprises:
a first ply; and
a second ply extending along a length of the first ply, wherein the first and second plies are attached at the fixed end, and wherein the first ply is connected to the second ply at the free end by overlapping the first ply around an end of the second ply.

2. The assembly of claim 1, wherein the free end and the first curved section of the finger seal has a plurality of slots that extend to connect to keyholes adjacent the free end, and wherein the keyholes are positioned above the main surface.

3. The assembly of claim 1, wherein the free end of the finger seal cantilevers to a second curved section disposed above the main surface.

4. The assembly of claim 1, wherein a cooling air flow is passed along the main surface.

5. The assembly of claim 4, wherein the cooling air flow passes along the curved section of the finger seal.

6. The assembly of claim 1, wherein the staggered elevation of the main surface relative to the raised mounting surface creates an undercut below the curved section of the finger seal.

7. The assembly of claim 1, wherein the main surface is recessed relative to a remainder of the component including the raised mounting surface.

8. An assembly for a gas turbine engine, comprising:
a component having a first surface and a second surface, wherein the first surface has an elevation that differs from an elevation of the second surface; and
a finger seal connected to the first surface, the finger seal comprising:
a curved portion;
a fixed end extending from the first surface to the curved portion that is substantially parallel to and spaced from the second surface to define an undercut cavity, wherein a cooling air flow is passed along the second surface and along the curved portion of the finger seat;
a first ply; and
a second ply extending along a length of the first ply, wherein the first and second plies are fixed at the first surface, and wherein the first ply is connected to the second ply at a free end of the finger seal by overlapping the first ply around an end of the second ply.

9. The assembly of claim 8, wherein the finger seal has a plurality of slots connected to keyholes, and wherein the keyholes are positioned above the undercut cavity.

10. The assembly of claim 8, wherein the second surface is recessed relative to a remainder of the component including the first surface.

11. The assembly of claim 8, wherein the first surface is formed by a raised portion of the component.

12. The assembly of claim 8, wherein the finger seal is fixed to the first surface and cantilevers to a free end that is disposed above the second surface.

13. An assembly for a gas turbine engine, comprising:
a component having a first surface, a mounting portion that extends from the first surface, and a second surface disposed on the mounting portion, wherein the second surface is offset from the first surface; and
a finger seal connected to the second surface at a fixed end of the finger seal, the fixed end extending from the second surface to a first curved portion of the finger seal, wherein the fixed end of the finger seal is substantially parallel to the second surface, and wherein an undercut cavity is at least partially defined by the fixed end of the finger seal and the first surface.

14. The assembly of claim 13, wherein the finger seal has a plurality of slots connected to keyholes, and wherein the keyholes are positioned above the undercut cavity.

15. The assembly of claim 13, wherein the finger seal is fixed to the second surface and cantilevers to a free end that is spaced from the first surface.

16. The assembly of claim 13, wherein a cooling air flow is passed along the first surface and the first curved portion of the finger seal and into the undercut cavity.

17. The assembly of claim 13, wherein the first surface is recessed relative to a remainder of the component including the second surface.

18. The assembly of claim 13, wherein the first surface of the component and the finger seal at least partially define a main cavity in communication with a cooling air source, and wherein the undercut cavity communicates with the main cavity at the first curved portion.

19. The assembly of claim 18, wherein the finger seal extends at an oblique angle to the second surface to a free end of the finger seal, the free end having a second curved portion adapted to seal against a seal surface of an adjacent component.

20. The assembly of claim 19, wherein the finger seal comprises:
   a first ply; and
   a second ply extending along a length of the first ply, wherein the first and second plies are fixed at the second surface, and wherein the first ply is connected to the second ply at the free end of the finger seal by overlapping the first ply around an end of the second ply.

\* \* \* \* \*

UNITED STATES PATENT AND TRADEMARK OFFICE
CERTIFICATE OF CORRECTION

| | |
|---|---|
| PATENT NO. | : 9,347,330 B2 |
| APPLICATION NO. | : 13/730900 |
| DATED | : May 24, 2016 |
| INVENTOR(S) | : Conway Chuong et al. |

It is certified that error appears in the above-identified patent and that said Letters Patent is hereby corrected as shown below:

In the Claims
Col. 6, Line 15
    Delete "seat"
    Insert --seal--

Signed and Sealed this
Nineteenth Day of July, 2016

Michelle K. Lee
*Director of the United States Patent and Trademark Office*